(12) United States Patent
Vandersteegen

(10) Patent No.: US 11,281,614 B2
(45) Date of Patent: Mar. 22, 2022

(54) STATIC ADDRESS ALLOCATION BY PASSIVE ELECTRONICS

(71) Applicant: MELEXIS TECHNOLOGIES NV, Tessenderlo (BE)

(72) Inventor: Peter Vandersteegen, Deurne (BE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 781 days.

(21) Appl. No.: 15/061,587

(22) Filed: Mar. 4, 2016

(65) Prior Publication Data

US 2016/0259747 A1     Sep. 8, 2016

(30) Foreign Application Priority Data

Mar. 6, 2015 (GB) ....................................... 1503802

(51) Int. Cl.
*G06F 13/40*     (2006.01)
*H04L 12/40*     (2006.01)
(Continued)

(52) U.S. Cl.
CPC ............ *G06F 13/404* (2013.01); *G06F 1/266* (2013.01); *G06F 1/3296* (2013.01);
(Continued)

(58) Field of Classification Search
CPC ......... H04L 12/40039; H04L 12/40006; H04L 12/40195; H04L 61/2038; H04L 61/6027;
(Continued)

(56) References Cited

U.S. PATENT DOCUMENTS 4,695,839 A    9/1987   Barbu et al.
6,166,653 A *   12/2000   Schulmeyer ......... G05B 19/042
                                                                         340/9.16
(Continued)

FOREIGN PATENT DOCUMENTS

DE    102008044777 B4    12/2015
EP        0556549 A1    8/1993
(Continued)

OTHER PUBLICATIONS

European Search Report from corresponding European Application No. EP 16 15 7811, dated Mar. 24, 2016.
(Continued)

*Primary Examiner* — Zachary K Huson
(74) *Attorney, Agent, or Firm* — Workman Nydegger

(57) ABSTRACT

A bus node IC comprises at least one static address selection terminal and a detecting circuit for detecting a state of the static address selection terminal, and a communication circuit adapted for determining a node address identifier taking the detected state into account. The detecting circuit is adapted for detecting the state by determining an electrical property of a passive electronic component when connected to the static address selection terminal. The communication circuit is adapted for receiving/transmitting data over the data bus in accordance with a first communication protocol using the node address identifier for identification of the IC, and for receiving/transmitting data over said data bus in accordance with a second communication protocol using a further node address identifier for identification of the IC, wherein the communication circuit is adapted for configuring the further node address identifier by using data received using the first protocol.

18 Claims, 6 Drawing Sheets

(51) Int. Cl.
    *G06F 1/26*     (2006.01)
    *G06F 1/3296*     (2019.01)
    *H04L 61/5038*     (2022.01)
    *G06F 13/42*     (2006.01)
    *H04L 101/627*     (2022.01)

(52) U.S. Cl.
    CPC ...... *G06F 13/4022* (2013.01); *G06F 13/4282* (2013.01); *H04L 12/40006* (2013.01); *H04L 61/2038* (2013.01); *H04L 61/6027* (2013.01)

(58) Field of Classification Search
    CPC ............... G06F 13/404; G06F 13/4282; G06F 13/4022; G06F 1/266; G06F 1/3296
    See application file for complete search history.

(56) References Cited

U.S. PATENT DOCUMENTS

| | | | |
|---|---|---|---|
| 6,282,668 | B1 | 8/2001 | Neudecker |
| 6,438,625 | B1 | 8/2002 | Olson |
| 7,328,286 | B2 | 2/2008 | Vinnemann |
| 2010/0121537 | A1 | 5/2010 | Tanaka |
| 2010/0306431 | A1* | 12/2010 | Adkins ............... G06F 13/4291 710/110 |
| 2011/0208886 | A1* | 8/2011 | Sugiura ................. H04L 12/403 710/110 |
| 2012/0020401 | A1 | 1/2012 | Itou et al. |
| 2014/0325244 | A1* | 10/2014 | Wang ........................ G06F 1/26 713/300 |

FOREIGN PATENT DOCUMENTS

| | | |
|---|---|---|
| EP | 1284556 A1 | 2/2003 |
| EP | 1455278 B1 | 6/2006 |
| GB | 2353448 A | 2/2001 |
| JP | H0879284 A | 3/1996 |
| WO | 2004068796 A2 | 8/2004 |

OTHER PUBLICATIONS

Great Britain Search Report from Application No. GB1503801.1, dated Aug. 24, 2015.
Great Britain Search Report from Application No. GB1503802.9, dated Sep. 3, 2015.

* cited by examiner

STATIC ADDRESS ALLOCATION BY PASSIVE ELECTRONICS

FIELD OF THE INVENTION

The invention relates to the field of data transmission, such as data transmission over automotive communication bus systems. More specifically it relates to means and methods for individual identification of substantially identical integrated circuit components on a communication bus.

BACKGROUND OF THE INVENTION

The present invention may for example relate to the identification of substantially identical sensor ICs in a vehicle data communication system, e.g. an automotive sensor network. For example, the present invention may relate to vehicle data communication systems, such as LIN or SENT communication systems. For example, car sensor systems may comprise a substantial number of identical ICs on the same bus, e.g. to provide redundancy and safety.

Deterministic communication protocols may require that each integrated circuit (IC) node is uniquely identified. This unique identification can for example be achieved by dynamically assigning identification addresses to the ICs connected to the communication bus. For example, a Unique User ID (also called Universally Unique Identifier, UUID) for bus communication purposes may be stored in each IC. IC vendors and sensor system assemblers aim to use identical components, including the IC. Therefore, it is advantageous to provide means and methods to differentiate substantially identical ICs connected to the same data bus, e.g. by the location of the IC defined by the application diagram. This identification also may be required early during assembly of the IC components in a system, e.g. to be used during the end of line calibration of a sensor module system.

Furthermore, in a sensor network comprising a plurality of identical sensor units, correlating a measurement transmitted over the sensor network to a corresponding sensing location can be particularly important in sensor controlled systems, regardless of whether the communication protocol requires such unique identification. Particularly, dynamic random assignment of identification addresses to the ICs connected to the communication bus may be unsuitable for a communication bus comprising substantially identical nodes where unique identification of each node, e.g. in terms of its location or use, is required, such as in a sensor network.

It is known in the art to use a serial chain connection between the IC devices, e.g. a daisy chain, to determine the position of each device by voltage division such that a unique identification can be assigned to each device. For example, DE 102008044777 and EP 1284556 disclose such arrangements for address allocation. However, such approaches may have the disadvantages of requiring one or more additional wires along the bus for establishing the daisy chain link, and of risking the interruption of the chain when a single component is faulty. The serial connection may thus cause a communication failure of at least the downstream components in the chain with respect to the failure location, and may even cause communication over the entire bus to fail.

The disadvantage of requiring additional wires may be overcame by U.S. Pat. No. 7,328,286, which discloses the use of switching means in the ICs for breaking a data line into segments during an address allocation phase. However, the second disadvantage persists, in that the data line can be interrupted by a faulty IC, thus affecting all ICs downstream. In the approach disclosed in this document, pull-up resistors may be used to encode a position in the network.

In EP 1455278 the supply voltage varies between ICs along the bus, due to a plurality of resistors arranged on supply line between the ICs. Thus, an IC can determine its position in the network by measuring its supply voltage. Such device configuration may avoid the disadvantages of a serial connection running through each IC on the bus, e.g. may avoid the disadvantage of potentially disrupting all communications over the bus when a single IC fails. However, in a data bus setup according to EP 1455278, the voltage supply is not constant for the different ICs, such that additional internal measures are needed to compensate, e.g. to provide a voltage source within voltage tolerance levels for powering components of the IC. The voltage division along the supply line can be particularly disadvantageous for performance sensitive and/or critical applications such as automotive applications. For example, sensor devices may require a well-defined supply voltage in order to prevent measurement error or sensor failure.

SUMMARY OF THE INVENTION

It is an object of embodiments of the present invention to provide good and efficient means and methods for allocation of a bus node address to an integrated circuit node on a communication bus.

The above objective is accomplished by a method and device according to the present invention.

In a first aspect, the present invention relates to a data bus node integrated circuit comprising at least one static address selection terminal, a detecting circuit, e.g. a detection circuit, for detecting a state of the at least one static address selection terminal, and a communication circuit for receiving and/or transmitting data over a data bus. The communication circuit is also adapted for, e.g. configured and/or programmed for, determining a node address identifier taking the detected state of the at least one static address selection terminal into account. The detecting circuit is furthermore adapted for detecting the state of the at least one static address selection terminal by determining an electrical property of a passive electronic component when connected to the at least one static address selection terminal.

The communication circuit is furthermore adapted for, e.g. configured and/or programmed for, receiving and/or transmitting data over the data bus in accordance with a first communication protocol using the node address identifier for identification of the data bus node integrated circuit. The communication circuit is furthermore adapted for, e.g. configured and/or programmed for, receiving and/or transmitting data over the data bus in accordance with a second communication protocol using a further node address identifier for identification of the data bus node integrated circuit. The communication circuit is adapted for, e.g. configured and/or programmed for, configuring the further node address identifier by using data received using the first communication protocol.

In a data bus node integrated circuit according to embodiments of the present invention, the detecting circuit may be adapted for, e.g. configured and/or programmed for, generating a signal indicative of an electrical resistance of a resistor when the resistor is connected to the at least one static address selection terminal.

A data bus node integrated circuit according to embodiments of the present invention may furthermore comprise a power supply terminal for receiving a power supply voltage and a voltage regulator for regulating the power supply voltage at a predetermined regulated power supply voltage level. The detecting circuit may furthermore be adapted for, e.g. configured and/or programmed for, applying the regulated power supply voltage to a serial chain to ground. The serial chain, e.g. an electrical series chain, may comprise a reference resistor and said resistor when connected to the at least one static address selection terminal, wherein 'said resistor' refers to the resistor having said electrical resistance indicated by said signal generated by the detecting circuit, when said resistor is connected to the at least one static address selection terminal, as described hereinabove.

In a data bus node integrated circuit according to embodiments of the present invention, the detecting circuit may comprise switching means for controllably connecting and disconnecting the at least one static address selection terminal via the reference resistor to the regulated power supply voltage.

In a data bus node integrated circuit according to embodiments of the present invention, the detecting circuit may be adapted for generating a signal indicative of the electrical resistance of said resistor when said resistor connects the at least one static address selection terminal to the ground voltage.

In a data bus node integrated circuit according to embodiments of the present invention, the at least one static address selection terminal may comprise a pair of static address selection terminals, and the detecting circuit may be adapted for generating a signal indicative of the electrical resistance of said resistor when said resistor electrically connects the pair of static address selection terminals.

In a data bus node integrated circuit according to embodiments of the present invention, the detecting circuit may comprise an analog-to-digital converter or a time to digital conversion circuit for generating a signal indicative of the electrical property of the passive electronic component when connected to the at least one static address selection terminal, and switching means adapted for selectively routing either a signal from the at least one static address selection terminal or from an analog signal chain to the analog-to-digital converter or the time to digital conversion circuit.

In a data bus node integrated circuit according to embodiments of the present invention, the detecting circuit may be adapted for generating a signal indicative of the characteristic time of a resistor-capacitor circuit when the resistor-capacitor circuit is connected to the at least one static address selection terminal.

In a data bus node integrated circuit according to embodiments of the present invention, the detecting circuit may be adapted for generating a signal indicative of the characteristic time of a resistor-capacitor circuit comprising an internal resistor and a capacitor when said capacitor is connected to the at least one static address selection terminal.

A data bus node integrated circuit according to embodiments of the present invention may also comprise a power supply terminal for receiving a power supply voltage and a voltage regulator for regulating the power supply voltage at a predetermined regulated power supply voltage level. The detecting circuit may be adapted for determining a time interval in which the voltage of the at least one address selection terminal rises from a first reference fraction of the regulated power supply voltage level to a second reference fraction of the regulated power supply voltage level.

For example, in a data bus node integrated circuit in accordance with embodiments of the present invention in which the detecting circuit generates a signal indicative of the characteristic time of a resistor-capacitor circuit, the signal indicative of the characteristic time may be determined by timing a time period in which a voltage received at the at least one static address selection terminal rises from a zero reference, e.g. a ground voltage, to a reference voltage, e.g. a predetermined fraction of a supply voltage. For example, the detecting circuit may comprise a clock signal generator or clock signal input and a counter for counting a number of clock signal pulses provided by the clock signal generator, or via the clock signal input, starting from a start time when a voltage on the at least one static address selection terminal is detected different from the zero reference and stopping at a stop time when a voltage on the at least one static address selection terminal is detected that is greater than the reference voltage. In a data bus node integrated circuit according to embodiments of the present invention, the at least one static address selection terminal may comprise said power supply terminal.

In a data bus node integrated circuit according to embodiments of the present invention, the voltage regulator may be adapted for regulating the power supply voltage by taking advantage of energy storage and filtering capabilities of the resistor-capacitor circuit, e.g. when the resistor-capacitor circuit is connected to the static address selection terminal or when the capacitor is connected to the at least one static address selection terminal such as to connect to the internal resistor to form the resistor-capacitor circuit.

In a data bus node integrated circuit according to embodiments of the present invention, the detecting circuit may be adapted for generating the signal indicative of said characteristic time when the voltage of the at least one address selection terminal rises above a predetermined threshold voltage.

A data bus node integrated circuit according to embodiments of the present invention may furthermore comprise a sensor module for providing at least one sensor measurement value to the communication circuit. The communication circuit may furthermore be adapted for transmitting the at least one sensor measurement value via the data bus, e.g. using the second communication protocol.

In a second aspect, the present invention also relates to a network system comprising a plurality of data bus node integrated circuits in accordance with embodiments of the first and/or fourth aspect of the present invention, and a data bus for relaying data from and/or to the plurality of data bus node integrated circuits. The network system may furthermore comprise a plurality of passive electronic components, each passive electronic component being connected to a static address selection terminal of a corresponding data bus node integrated circuit of the plurality of data bus node integrated circuits. Each passive electronic component may furthermore be a component separate from each of the data bus node integrated circuits, e.g. a passive electronic component that is not integrated in any of the data bus node integrated circuits. For example, each of the data bus node integrated circuits may be identical, e.g. identically manufactured, yet uniquely configured by the connection to a passive electronic component having different electrical characteristics, e.g. a different resistance, capacitance or impedance.

In a third aspect, the present invention also relates to a method for statically addressing a plurality of data bus node integrated circuits on a data bus. This method comprises connecting a plurality of data bus node integrated circuits to a data bus, each data bus node integrated circuit comprising at least one static address selection terminal. The method further comprises electrically connecting the at least one static address selection terminals of the data bus node integrated circuits to corresponding passive electronic components such as to provide a unique state or unique combination of states on the at least one static address selection terminal of each data bus node integrated circuit. The method also comprises detecting the state of the at least one static address selection terminal in each data bus node integrated circuit by determining an electrical property of the passive electronic component connected thereto and determining a node address identifier in each data bus node integrated circuit taking the detected state of the at least one static address selection terminal into account.

This method also comprises receiving and/or transmitting data over the data bus in accordance with a first communication protocol using the node address identifier determined in each data bus node integrated circuit for identification of the data bus node integrated circuit, and configuring a further node address identifier for each data bus node integrated circuit taking data received by the data bus node integrated circuit using the first communication protocol into account. The method further comprises receiving and/or transmitting data over the data bus in accordance with a second communication protocol using this further node address identifier for identification of each data bus node integrated circuit.

In embodiments according to the present invention, said step of detecting may comprise, in each data bus node integrated circuit, switching a switching means integrated in the data bus node integrated circuit such as to route a signal from the at least one static address selection terminal to an analog-to-digital converter, or alternatively a time to digital conversion circuit, integrated in the data bus node integrated circuit. The step of detecting may further comprise, in each data bus node integrated circuit, generating a signal indicative of the electrical property of the passive electronic component using the analog-to-digital converter or the time to digital conversion circuit. The step of detecting may also comprise, in each data bus node integrated circuit, switching the switching means such as to route a signal from an analog signal chain to the analog-to-digital converter.

In a fourth aspect, the present invention relates to a data bus node integrated circuit comprising at least one static address selection terminal, a detecting circuit, e.g. a detection circuit, for detecting a state of the at least one static address selection terminal, and a communication circuit for receiving and/or transmitting data over a data bus. The communication circuit is also adapted for, e.g. configured and/or programmed for, determining a node address identifier taking the detected state of the at least one static address selection terminal into account. The detecting circuit is furthermore adapted for detecting the state of the at least one static address selection terminal by determining an electrical property of a passive electronic component when connected to the at least one static address selection terminal. The detecting circuit is furthermore adapted for, e.g. configured and/or programmed for, generating a signal indicative of an electrical resistance of a resistor when said resistor is connected to said at least one static address selection terminal. The detecting circuit, in accordance with embodiments of the fourth aspect of the present invention, comprises an analog-to-digital converter or a time to digital conversion circuit for generating a signal indicative of the electrical property of the passive electronic component when connected to the at least one static address selection terminal, and switching means adapted for selectively routing either a signal from the at least one static address selection terminal or from an analog signal chain to the analog-to-digital converter or the time to digital conversion circuit.

A data bus node integrated circuit according to embodiments of the fourth aspect of the present invention may furthermore comprise a power supply terminal for receiving a power supply voltage and a voltage regulator for regulating the power supply voltage at a predetermined regulated power supply voltage level. The detecting circuit may furthermore be adapted for, e.g. configured and/or programmed for, applying the regulated power supply voltage to a serial chain to ground. The serial chain, e.g. an electrical series chain, may comprise a reference resistor and said resistor when connected to the at least one static address selection terminal.

In a data bus node integrated circuit according to embodiments of the fourth aspect of the present invention, the detecting circuit may comprise switching means for controllably connecting and disconnecting the at least one static address selection terminal via the reference resistor to the regulated power supply voltage.

In a data bus node integrated circuit according to embodiments of the fourth aspect of the present invention, the detecting circuit may be adapted for generating a signal indicative of the electrical resistance of said resistor when said resistor connects the at least one static address selection terminal to the ground voltage.

In a data bus node integrated circuit according to embodiments of the fourth aspect of the present invention, the at least one static address selection terminal may comprise a pair of static address selection terminals, and the detecting circuit may be adapted for generating a signal indicative of the electrical resistance of said resistor when said resistor electrically connects the pair of static address selection terminals.

A data bus node integrated circuit according to embodiments of the present invention may furthermore comprise a sensor module for providing at least one sensor measurement value to the communication circuit, e.g. via said analog signal chain. The communication circuit may furthermore be adapted for transmitting the at least one sensor measurement value via the data bus.

It is an advantage of embodiments of the present invention that robust static address assignment can be achieved while using the available input and output (I/O) terminal connections, e.g. chip pins, of the integrated circuit node efficiently.

It is an advantage of embodiments of the present invention that a bus node address can be statically and deterministically detected, while being tolerant for power supply fluctuations. It is an advantage of embodiments of the present invention that a bus node address can be statically and deterministically detected via an electrical signal provided via a power supply connection terminal, e.g. a power supply pin, during a startup or configuration cycle of the IC device, while also allowing a power supply voltage to be provided through the power supply connection terminal during operation which does not depend on said signal, e.g. corresponding to a reference voltage independent of the bus node address.

It is an advantage of embodiments of the present invention that a robust operation of an integrated circuit device can be achieved under power supply fluctuations.

It is an advantage of embodiments of the present invention that an address can be deterministically selected from a large address space, while only few connector terminals of the IC pin-out are being used for address selection purposes, and only a simple integrated circuit design is required for determining the selected address, e.g. a simple and low cost IC component can determine the selected address. It is an advantage of embodiments of the present invention that an address can be deterministically selected from a large address space, e.g. comprising N possible unique address identifiers, while requiring less than log2(N) address selection pins and only requiring a simple integrated circuit component for address determination in the integrated circuit node, e.g. a simple and low cost component. It is furthermore an advantage of such embodiments that address assignment can be fully deterministic.

It is an advantage of embodiments of the present invention that an address can be assigned to the integrated circuit node without requiring a dedicated serial chain between communication nodes. Thus, no additional wires along the bus are needed for establishing a daisy chain link for address assignment. Furthermore, if a communication node on the bus is faulty, a low risk of disruption of other integrated circuit nodes communicating over the same bus is achieved. It is an advantage of embodiments of the present invention that an easy and simple system assembly comprising a plurality of substantially identically integrated circuit nodes can be achieved while statically assigning a unique user id to each IC.

It is an advantage of embodiments of the present invention that substantially identical ICs can be automatically assigned an address identifier in a communication system based on their particular location in the system, e.g. based on the system wiring or application diagram.

It is an advantage of embodiments of the present invention that substantially identical ICs can be differentiated on a data communication bus by simply applying at least one passive impedance component to at least one IC connection terminal, e.g. such as a resistor, capacitor or inductor.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
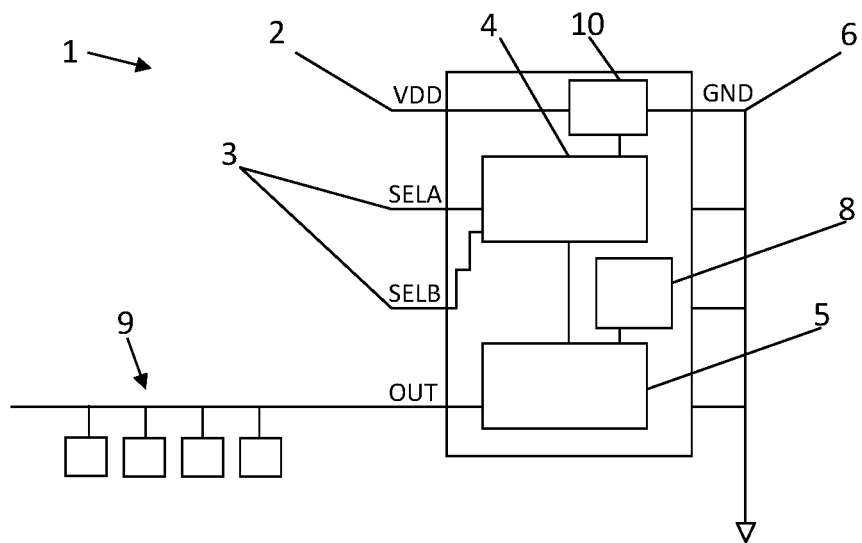
FIG. 1 shows a data bus node integrated circuit (IC) according embodiments of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to a "passive electronic component", reference is made to an electronic element having a well-defined impedance characteristic, e.g. a capacitor, inductor or resistor, or a combination of such elements, e.g. a resistor-capacitor circuit. It is to be noted that in embodiments of the present invention, a passive electronic component may specifically refer to a resistor having a substantial electrical resistance value, e.g. at least 10 Ohm, or a capacitor having a substantial capacitance, e.g. at least 10 pF, or a circuit combining such resistor and capacitor, e.g. by series or parallel coupling. In other words, while a simple conductive wire segment may have a parasitic capacitance and/or resistance, this may not be considered as a passive electronic component per se in the context of the present invention.

Where in embodiments of the present invention reference is made to an "electric connection terminal" or simply to a "terminal", reference is made to a bond pad, pin or other electrically conductive element of an integrated circuit device for establishing an electrical connection between the integrated circuit device and an external component for integrating the integrated circuit device into a larger system. Such terminals, e.g. pad or pin, may be configured to receive a reference voltage or current supply, receiving electric signals in analog or digital form from the system and/or sending electric signals in analog or digital form to the system. The larger system may for example refer to a printed circuit board (PCB) for accommodating the integrated circuit device, or to any larger system of which the integrated circuit device is a functional part of, e.g. a vehicle comprising for example sensors, controllers and actuators integrated in an operational control framework.

Where in embodiments of the present invention reference is made to "static addressing", e.g. to a static address selection terminal, reference is made to deterministic addressing facilitated by a state of an electric external connection terminal of the integrated circuit according to embodiments. It does not refer to static addressing in the sense of precluding any dynamic component of the address assignment, e.g. the static addressing may have a limited dynamic character. For example, the state of an external electric connection terminal may be deterministically determined by the configuration of the integrated circuit as a component in a application diagram, and addresses may be dynamically allocated to a plurality of substantially identical integrated circuits according to embodiments, e.g. by a controller, in a deterministic order, e.g. from a predetermined address space sequence, determined by the respective states of the static address selection terminals of the integrated circuits.

In a first aspect, the present invention relates to a data bus node integrated circuit comprising at least one static address selection terminal, a detecting circuit for detecting a state of the at least one static address selection terminal and a communication circuit for receiving and/or transmitting data over a data bus. The communication circuit is furthermore adapted for determining a node address identifier taking the detected state of the at least one static address selection terminal into account. The detecting circuit is adapted for detecting the state of the at least one static address selection terminal by determining an electrical property of a passive electronic component when connected to the at least one static address selection terminal.

The communication circuit is furthermore adapted for, e.g. configured and/or programmed for, receiving and/or transmitting data over the data bus in accordance with a first communication protocol using the node address identifier for identification of the data bus node integrated circuit. The communication circuit is furthermore adapted for, e.g. configured and/or programmed for, receiving and/or transmitting data over the data bus in accordance with a second communication protocol using a further node address identifier for identification of the data bus node integrated circuit. The communication circuit is adapted for, e.g. configured and/or programmed for, configuring the further node address identifier by using data received using the first communication protocol.

The data bus node integrated circuit may further comprise a power supply terminal for receiving a power supply voltage. The data bus node integrated circuit may also comprise a ground terminal for receiving a ground voltage. The data bus node integrated circuit may also comprise a voltage regulator for regulating the power supply voltage at a predetermined regulated power supply voltage level, e.g. such as to provide a regulated power supply voltage at a predetermined electric potential level with respect to the ground voltage. Thus, embodiments of the present invention can provide a stabilized internal power supply and may use this stable power supply for assigning a data bus address in a robust manner. Thus, problems related to a non-constant external supply voltage can be avoided or mitigated, and an address can be assigned to the device in a simple, efficient and reproducible manner.

The detecting circuit may be adapted for generating a signal indicative of the characteristic time of a resistor-capacitor (RC) circuit when this resistor-capacitor circuit is connected to the at least one static address selection terminal, e.g. for detecting the state of the at least one static address selection terminal by generating a signal indicative of the characteristic time of a resistor-capacitor (RC) circuit when this resistor-capacitor circuit is connected to the at least one static address selection terminal. For example, the detecting circuit may be adapted for determining a time interval in which the voltage of the at least one address selection terminal rises from a first reference fraction, e.g. 0%, of the regulated power supply voltage to a second reference fraction, e.g. 66%, of the regulated power supply voltage.

Additionally or alternatively, the detecting circuit may be adapted for generating a signal indicative of an electrical resistance of a resistor when connected to the at least one static address selection terminal, e.g. for detecting the state of the at least one static address selection terminal.

The detecting circuit, e.g. the detection circuit, e.g. the detection circuit for detecting the state of the at least one static address selection terminal, may comprise an analog-to-digital converter for generating a signal indicative of the electrical property of the passive electronic component when connected to the at least one static address selection terminal.

Alternatively, the detecting circuit may comprise a time to digital conversion circuit for generating the signal indicative of the electrical property of the passive electronic component when connected to the at least one static address selection terminal.

The detecting circuit may further comprise switching means for selectively routing either a signal from the at least one static address selection terminal or from an analog signal chain to the analog-to-digital converter or the time to digital conversion circuit.

Figure 2:
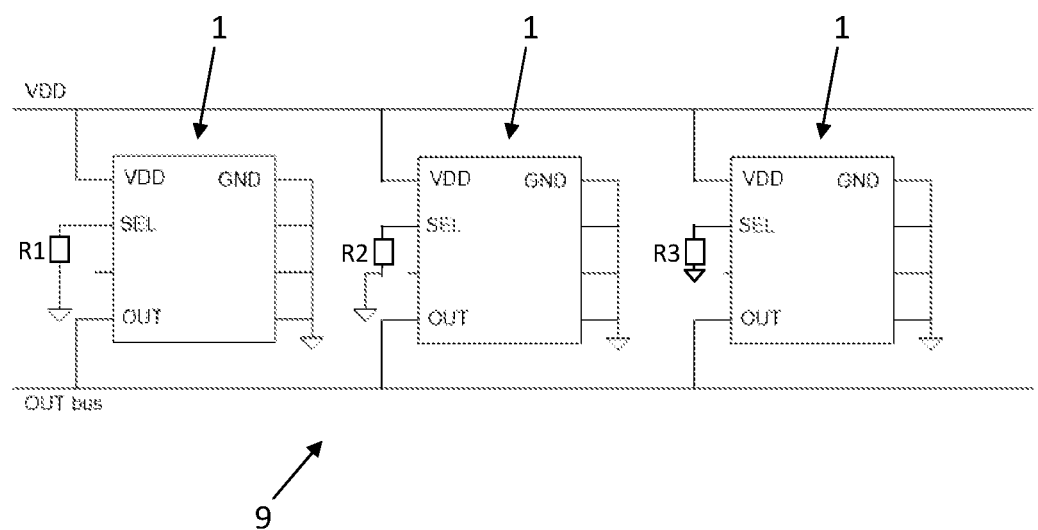
FIG. 2 shows data bus node ICs connected to a data bus in accordance with embodiments of the present invention, wherein static address selection is carried out by pull-down resistors.
Figure 3:
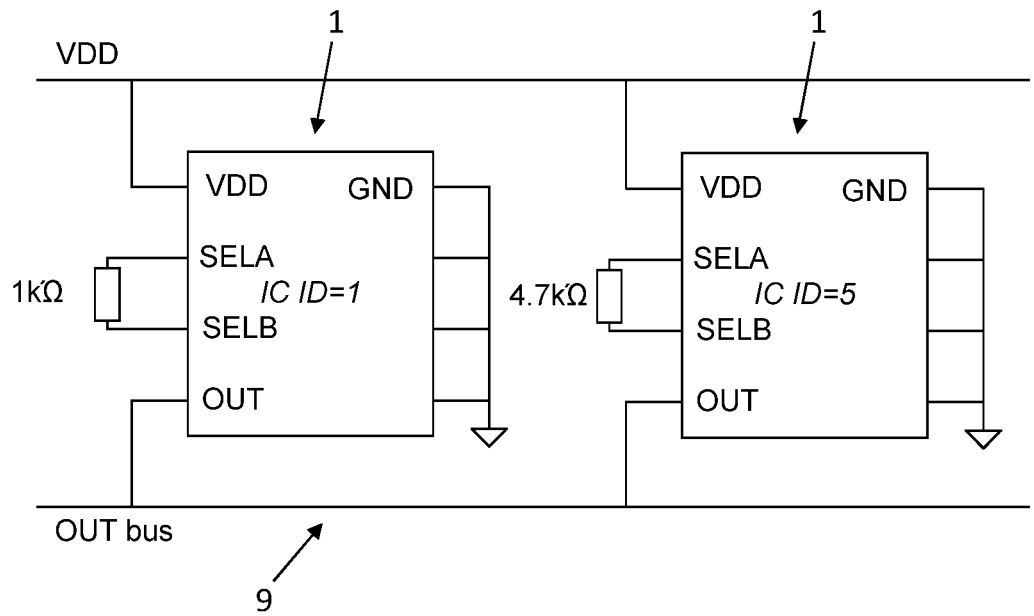
FIG. 3 shows data bus node ICs connected to a data bus in accordance with embodiments of the present invention, wherein static address selection is carried out by resistors connected between pairs of terminals of the ICs.

FIG. 1 shows a data bus node integrated circuit (IC) 1 according embodiments of the present invention. This bus node integrated circuit 1 may for example be adapted for communicating data over a data bus 9. For example, the data bus 9 may be configured to transmit data from and/or to a plurality of substantially identical data bus node integrated circuits 1, as illustrated in FIG. 2 and FIG. 3. For example, bus node integrated circuit devices 1 according to embodiments of the present invention may be adapted for communicating data over a vehicle data communication bus, such as a controller area network (CAN), local interconnect network (LIN) or single edge nibble transmission (SENT) communication bus. Furthermore, the a bus node integrated circuit device 1 according to embodiments of the present invention may be adapted for communicating data over a vehicle data communication bus that comprises a power supply line, e.g. in which data communication is performed via the power supply line VDD. For example, in an exemplary embodiment shown in FIG. 9, the power supply line 2 also fulfills the function of a data communication bus. For example, a two-wire communication protocol may be used, e.g. in which the integrated circuit may transfer data by modulating the current on the supply line, while receiving data from a controller in a voltage modulated form. For example, bus node integrated circuit devices 1 according to embodiments of the present invention may be adapted for communicating data over a vehicle data communication bus, such as a peripheral sensor interface 5 (PSI5) communication bus.

The integrated circuit device 1 may comprise a plurality of electric connection terminals, e.g. for receiving or sending electrical signals from or to electrical or electronic elements connected to the integrated circuit device. These electric connection terminals may provide power-related and/or signal-related functions. In operation, these terminals may mate with corresponding contacts or connectors having corresponding functions of a larger system. The electric connection terminals may comprise male connectors, e.g. pins, female socket connectors or contact connectors. Regardless of gender-type of these connectors, the electric connection terminals may have well-defined functions as may be defined by a pin-out specification. The data bus node integrated circuit 1 may comprise at least one power supply terminal 2 and at least one ground terminal 6 for respectively receiving a power supply voltage VDD and a ground voltage GND. Thus, the plurality of electrical connection terminals may comprise a positive power supply terminal and a negative power supply terminal for receiving a supply voltage pair from an external power supply. Where reference is made in this description to a power supply voltage and ground voltage pair, e.g. where reference is made to VDD and GND, it shall be understood that this refers to a pair of externally provided voltage potentials, e.g. a direct current (DC) voltage supply pair. However, these voltage potentials may fluctuate due to, for example, electromagnetic interference or mechanically induced changes in resistance along the supply lines.

Figure 9:
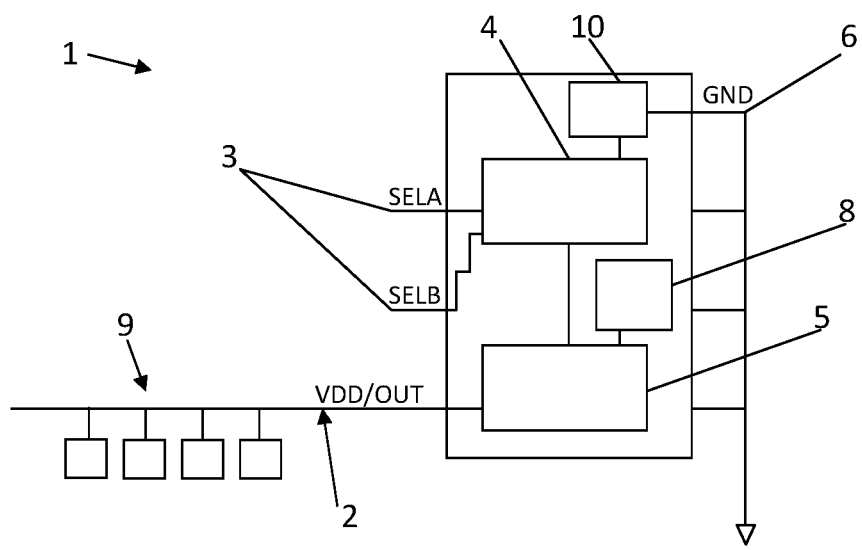
FIG. 9 shows another exemplary data bus node integrated circuit according to embodiments of the present invention.

The plurality of electric connection terminals may also comprise at least one data communication terminal for receiving and/or sending a data communication signal OUT, e.g. for sending data to the data bus 9 and/or for receiving data from the data bus 9, for example a CAN, LIN, SENT or other, possibly proprietary, communication bus. Although in embodiments of the present invention, the data communication terminal OUT may be distinct from a power voltage supply terminal VDD, e.g. as illustrated in FIG. 1, in other embodiments, the data communication terminal OUT and the power voltage supply terminal VDD may be the same electric connection terminal, as shown in FIG. 9. For example, the integrated circuit may be adapted for data communication over such data communication and power supply terminal OUT/VDD by a two-wire protocol such as PSI5.

Furthermore, in embodiments according to the present invention, the static address selection terminal may be an electrical connection terminal that is also used as a power voltage supply terminal or as a regulator voltage supply terminal. However, in other embodiments, the static address selection terminal may not be used as a power voltage supply terminal nor as a regulator voltage supply terminal.

The data bus node integrated circuit 1 may also comprise a voltage regulator 10 for regulating the power supply voltage. This voltage regulator 10 may provide a regulated power supply voltage, e.g. a substantially constant regulated power supply voltage, at a predetermined electric potential level with respect to the ground voltage. This voltage regulator 10 may be connected to the power supply terminal 2 to receive the power supply voltage VDD, and may provide the regulated power supply voltage to other components of the IC 1. It is an advantage of embodiments of the present invention that power supply fluctuations can be compensated by using an internal regulator, such that sensitive IC components, e.g. a sensor module, can function with reduced risk of systemic failures or functional inaccuracies under non-constant power supply conditions. This may for example be particularly advantageous in automotive sensor networks, where a high degree of robustness may be required for safety reasons, while vibrations and electromagnetic interference in an uncontrolled and unpredictable environment may adversely affect the stability of power supply lines. The voltage regulator may be a voltage regulator suitable for integration in an integrated circuit as known in the art, e.g. may comprise a resistor element in series with at least one diode in order to regulate a voltage using the advantageous logarithmic voltage as function of current relation of the diode. However, such voltage regulator may also be more complex, e.g. may be an active regulator comprising diodes, capacitors, resistors, potentiometers and/or a digital or analog control circuit.

For example, a potential difference may be provided during operation between the power supply terminal 2 and the ground terminal 6, which may be regulated into a substantially constant potential difference by the voltage regulator 10, for example providing a substantially constant difference of 3.30 V or 5 V. This regulated supply voltage may be used for powering the integrated circuit device 1 while in operation. It is an advantage of embodiments of the present invention that this voltage regulator 10 may advantageously offer a stable power supply for sensitive components, e.g. sensor components, while the regulated voltage can also be advantageously used to determine a unique address identifier for bus communications in a robust manner.

The data bus node integrated circuit 1 comprises at least one static address selection terminal 3. For example, the plurality of electrical connection terminals may comprise at least one static address selection terminal 3. The term static address selection terminal refers to an electrical connection terminal suitable for being operably connected to an external passive electronic component such as to enable the static assignment of an address, e.g. a bus node address identifier, by the integrated circuit 1, where this address assignment can be carried out by detecting a property of this external electrical component or a property of an electrical signal transmitted through this external electrical component. It is a further advantage of embodiments of the present invention that such external electrical component may be electrically disconnected and/or physically disconnected once the address assignment has been performed. For example, the integrated circuit may be adapted for electrically disconnecting the external electrical component after detecting the state of the at least one static address selection terminal, and/or the integrated circuit may be adapted for allowing a user to physically disconnect the external electrical component after the state of the at least one static address selection terminal has been detected without impeding normal operation of the integrated circuit.

The data bus node integrated circuit further comprises a detecting circuit 4 for detecting a state of the at least one static address selection terminal. The detecting circuit 4 may be adapted for outputting a signal or plurality of signals representing the state of the at least one static address selection terminal 3, e.g. in the form of at least one digital signal to be provided to a communication circuit 5.

The detecting circuit 4 is furthermore adapted for detecting the state of the at least one static address selection terminal 3 by determining an electrical property of a passive electronic component when connected to the at least one static address selection terminal 3, e.g. determining an electrical property of a passive electronic component when connected to the at least one static address selection terminal taking the regulated power supply voltage level into account.

The detecting circuit 4 may be adapted for generating a signal indicative of an electrical resistor when this electrical resistor is connected to the at least one static address selection terminal 3. For example, the detecting circuit may be adapted for detecting the state of the at least one static address selection terminal by applying the regulated power supply voltage to a reference resistor connected in series to the at least one static address selection terminal, and generating a signal indicative of the voltage drop over the at least one static address selection terminal. This is further explained hereinbelow in relation to a first exemplary embodiment of the present invention.

Figure 6:
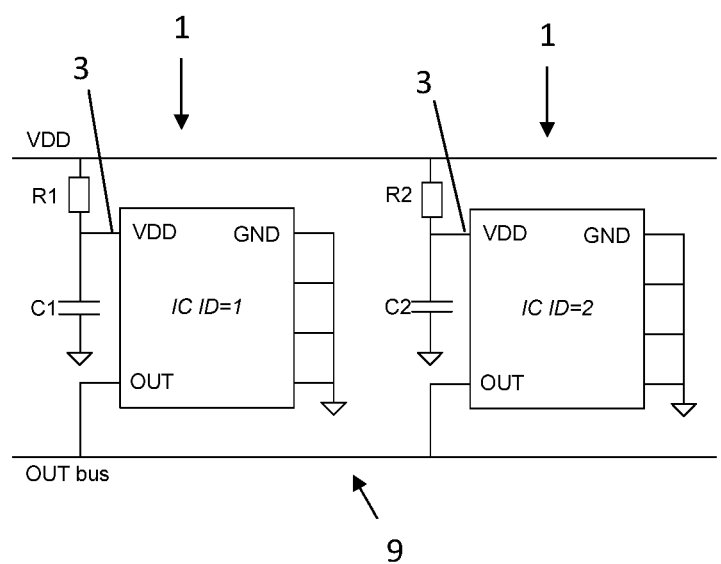
FIG. 6 illustrates data bus node ICs according to embodiments of the present invention, wherein static address selection is carried out by resistor-capacitor circuits.

The detecting circuit 4 may be adapted for generating a signal indicative of the characteristic time of a resistor-capacitor circuit, e.g. measuring a signal indicative of the characteristic time of a resistor-capacitor circuit, e.g. measuring a characteristic time of a resistor-capacitor circuit, when this resistor-capacitor circuit is connected to the at least one static address selection terminal 3. In embodiments of the present invention, the at least one static address selection terminal 3 may comprise a voltage supply terminal VDD, e.g. as shown in FIG. 6, or may comprise any other electric connection terminal, e.g. as shown in FIG. 1. The detecting circuit 4 may be adapted for determining the time in which a voltage potential at the at least one address selection terminal varies from a first reference level to a second reference level. For example, the detecting circuit may be adapted for determining a time interval in which the voltage of the at least one address selection terminal rises from a first reference fraction, e.g. 0%, of the regulated power supply voltage to a second reference fraction, e.g. 66%, of the regulated power supply voltage. This is further explained hereinbelow in relation to a second exemplary embodiment of the present invention.

It shall be understood by the person skilled in the art that features and aspects of these embodiments explained herein, such as the first exemplary embodiment and the second exemplary embodiment referred to hereinabove, can be combined. For example, an integrated circuit 1 can combine both resistive measurements and characteristic time measurements as described in respectively the first exemplary embodiment and the second exemplary embodiment, e.g. for defining two address identifiers to be used to two separate bus systems it is connected to, for defining two components to be combined into a single address identifier, or to provide a failsafe mechanism in case either method for address assignment fails. Furthermore, other addressing methods known in the art can be combined with embodiments of the present invention, as shall be understood by the person skilled in the art, e.g. a portion of the address identifier can be defined by IC hardware, firmware or software, for example such that an addressing mechanism according to embodiments can be used to determine addresses of identical ICs on a data bus, while reserving different address ranges for different types of ICs.

The data bus node integrated circuit 1 further comprises a communication circuit 5 for receiving and/or transmitting data over a data bus 9. This communication circuit 5 is also adapted for determining a node address identifier, e.g. an identifier for uniquely identifying the integrated circuit device 1 on the data bus 9, taking the detected state of the at least one static address selection terminal 3 into account. The communication circuit 5 may comprise an address assignment unit for determining the node address identifier based on the state or states of the at least one static address selection terminal. For example, each state of the static address selection terminal (where only one such terminal is provided), or each unique combination of states of the static address selection terminals (where multiple such terminals are provided), may be mapped onto a corresponding unique address identifier by the communication unit 5.

The communication circuit 5 may also comprise a storage memory for storing the node address identifier. Furthermore, this storage memory may be a persistent memory, e.g. may be an EEPROM memory or a flash memory. Thus, the communication circuit 5 may be adapted for determining the address identifier only during an initial installation or configuration cycle, e.g. during an end-of-line calibration after assembly of a system in which the IC is installed, e.g. in an end-of-line calibration of a sensor network.

Furthermore, an end of line calibration may use a deterministic communication protocol different from the communication protocol used in normal operation. The data bus node integrated circuit 1 may thus comprise a communication circuit 5 for receiving and/or transmitting data over a data bus 9 in accordance with the communication protocol used in normal operation, e.g. a LIN or SENT data communication protocol. For example, normal operation may refer to the transmission of sensor data over the communication network. Furthermore, the communication circuit 5 may be adapted for determining a node address identifier taking the detected state of the at least one static address selection terminal 3 into account, in which this node address identifier may not be used for the communication protocol during normal operation, but only for an initial identification of the integrated circuit 1 during an end-of-line procedure, e.g. a calibration during manufacture of a larger system comprising the integrated circuit 1. Thus, the deterministic communication protocol may be used to determine the initial identification of the integrated circuit, and, for example, another node address identifier may be programmed, e.g. stored in a storage memory of the integrated circuit 1 for use by the communication protocol used in normal operation. Thus, the deterministic communication protocol may refer to, for example, a proprietary protocol for end-of-line calibration of the integrated circuit. Therefore, a UUID node address identifier during start-up or calibration, e.g. a hardware-based UUID in accordance with embodiments of the present invention, may differ from a UUID programmed during start-up or calibration. For example, an End of Line Calibration, e.g. using a proprietary deterministic communication protocol, may comprise the writing of the UUID to be used for normal communication, e.g. a UUID for SENT or LIN communication, in the chip's memory.

For example, a communication circuit 5 of a data bus node integrated circuit 1 according to embodiments of the present invention may be adapted for receiving and/or transmitting data over the data bus 9 in accordance with a first communication protocol, which may be a deterministic communication protocol, e.g. an end-of-line calibration protocol. For example, such end-of-line calibration protocol may be a proprietary protocol, e.g. may be provided specifically by the manufacturer for calibration and initialization of the integrated circuit or circuits in a system without necessarily conforming with an industry-wide communication standard. This first communication protocol may use the node address identifier, determined as described hereinabove via the at least one address selection terminal, for identification of the data bus node integrated circuit. The communication circuit 5 may also be adapted for receiving and/or transmitting data over the data bus 9 in accordance with a second communication protocol, such as a standard communication protocol, e.g. a LIN or SENT protocol. For this second communication protocol, the communication circuit 5 may be adapted for using a further node address identifier for identification of the data bus node integrated circuit, in which the communication circuit 5 may be adapted for configuring the further node address identifier by using data received using said first communication protocol. For example, the data bus node integrated circuit may comprise a storage memory for storing the further node address identifier, which may for example be received in an initial system setup calibration, e.g. from a system control node, via the first communication protocol. It shall also be clear to the person skilled in the art that the first and the second communication protocol do not necessarily use the same set of chip terminals to connect to the data bus 9, e.g. the data bus 9 may refer to two distinct communication bus systems to which the integrated circuit can connect via two separate sets of terminals, or may refer to substantially the same communication bus system to which the IC may connect via a single set of terminals, or may refer to distinct communication bus systems to which the IC may connect via a single set of terminals depending on a configuration state of the IC and/or a larger system in which it participates.

The integrated circuit 1 may be adapted for installation on a printed circuit board (PCB). On this PCB, resistors may be provided to connect to one or more pins of the IC, corresponding to the at least one static address selection terminal 3, or RC circuits may be provided to connect at least one static address selection terminal 3 via a resistor to a supply voltage line and via a capacitor to a ground voltage line. Thus, a hardware address can be internally determined by the IC, as configured by the passive electric elements connected via the pin-out to the IC. Furthermore, the PCB may comprise a plurality of installation locations for a plurality of integrated circuits 1 according to embodiments of the present invention, e.g. a plurality of sockets for receiving these ICs, in which each location has a different, e.g. a unique configuration provided on the PCB for the at least one static address selection terminal for an IC 1 when installed at that location. It is an advantage of embodiments of the present invention that a simple system assembly can be achieved and a unique user id can be statically assigned to each IC. This may be particularly advantageous for sensor systems, e.g. having multiple identical sensor ICs on a single data bus, for example sensor networks for car systems. In such systems, a fully deterministic identification mechanism may be required or highly preferred, while a simple means for providing such identification is also advantageous, e.g. for reasons of cost.

The data bus node integrated circuit 1 may comprise a sensor module 8 adapted for providing at least one sensor measurement value to the communication circuit 4. The communication circuit 4 may be adapted for transmitting the at least one sensor measurement value via the data bus 9. For example, the data bus node integrated circuit 1 may be a sensor chip for transmitting sensor data over a data bus, e.g. an automotive sensor network bus. The sensor module 8 may comprise a transducer or sensing element for generating a signal representative of a physical quantity, for example a pressure or a temperature.

In a first exemplary embodiment of the present invention, the detecting circuit 4 is adapted for detecting the state of the at least one static address selection terminal 3 by determining an electrical property of the at least one static address selection terminal 3 in relation to the regulated voltage supply, where this electrical property relates to an electrical resistance. In this first exemplary embodiment, the detecting circuit 4 may be adapted for generating a signal indicative of an electrical resistance of a resistor when this resistor is connected to said at least one static address selection terminal 3. For example, the state of the at least one static address selection terminal may be detected by applying the regulated power supply voltage to the at least one static address selection terminal and determining a value indicative of the magnitude of the current flowing via the at least one static address selection terminal. The possible states of the at least one static address selection terminal 3 may therefore correspond to predetermined discrete values or non-overlapping ranges of electrical resistance.

In embodiments of the present invention, the at least one static address selection terminal 3 may be a different terminal than the ground terminal 6 and the voltage supply terminal 2. The at least one static address selection terminal 3 may be adapted for being connected over a resistor element to the ground, e.g. to a pull-down resistor, as shown in FIG. 2. Thus, a pull-down resistor having an electrical resistance corresponding to an address to be selected can be externally connected to the at least one static address selection terminal 3, such that the detecting circuit 4 may detect the resistance value, e.g. discern the resistance to ground from a plurality of possible resistance values, e.g. each having an predefined, associated address. A plurality of ICs 1 connected to a single bus 9 can therefore be assigned different addresses, e.g. unique user IDs, for bus communication purposes by connecting resistors having different resistance values R1, R2, R3 to the respective ICs. The at least one static address selection terminal 3 may be electrically isolated from the supply voltage.

In embodiments of the present invention, the at least one static address selection terminal may comprise a plurality of static address selection terminals, e.g. such as to select the address via a combination of resistors connected between each of the at least one static address selection terminals and the ground.

In another example, the at least one static address selection terminal 3 may comprise a pair of static address selection terminals, in which this pair of static address selection terminals is adapted for being connected on both ends of a resistor element, e.g. the pair of terminals SELA, SELB shown in FIG. 3. Thus, a resistor having an electrical resistance corresponding to an address to be selected can be externally connected to the pair of static address selection terminals, e.g. such that a single unbranched current path can run from the first terminal SELA of this pair, over the externally connected resistor to the second terminal SELB of this pair.

The detecting circuit 4 may detect the resistance value, e.g. discern the resistance from a plurality of possible resistance values, e.g. which each may have a predefined, associated address. A plurality of ICs 1 connected to a single bus 9 can therefore be assigned different addresses, e.g. unique user IDs, for bus communication purposes by connecting resistors having different resistance values, e.g. 1 kΩ, 2kΩ, 3 kΩ, . . . between the pair of static address selection terminals of the respective ICs, or between a static address selection terminal and the electrical ground. The at least one static address selection terminal 3 may be electrically isolated from the external supply voltage, e.g. such that fluctuations or deviations from a nominal voltage of the supply do not influence the measurement of the resistance directly, and thus do not adversely affect the address assignment.

In embodiments of the present invention, the at least one static address selection terminal may comprise at least one further pair of static address selection terminals, e.g. such as to select the address via a combination of resistors connected between terminals of the respective pairs.

The detecting circuit 4 may be adapted for detecting the state of the at least one static address selection terminal 3, wherein this state is characterized by a predetermined resistance to the ground or by a predetermined resistance between two terminals of a pair of static address selection terminals. For example, a predetermined electrical resistance value of a pull-down resistor, when externally connected to the at least one static address selection terminal 3, may bring the at least one static address selection terminal 3 in a corresponding state, or, for example, a predetermined electrical resistance value of a resistor, when externally connected between the terminals of the pair of static address selection terminals, may bring the at least one static address selection terminal 3 in a corresponding state.

The detecting circuit 4 may be adapted for applying the regulated power supply voltage to the at least one static address selection terminal, and determining a value indicative of the magnitude of the current flowing via said at least one static address selection terminal. Alternatively, the detecting circuit 4 may be adapted for applying the regulated power supply voltage to a serial chain to ground via a reference resistor and the at least one static address selection terminal. Thus, a value indicative of the magnitude of the potential difference over the at least one static address selection terminal and the ground can be determined.

Figure 4:
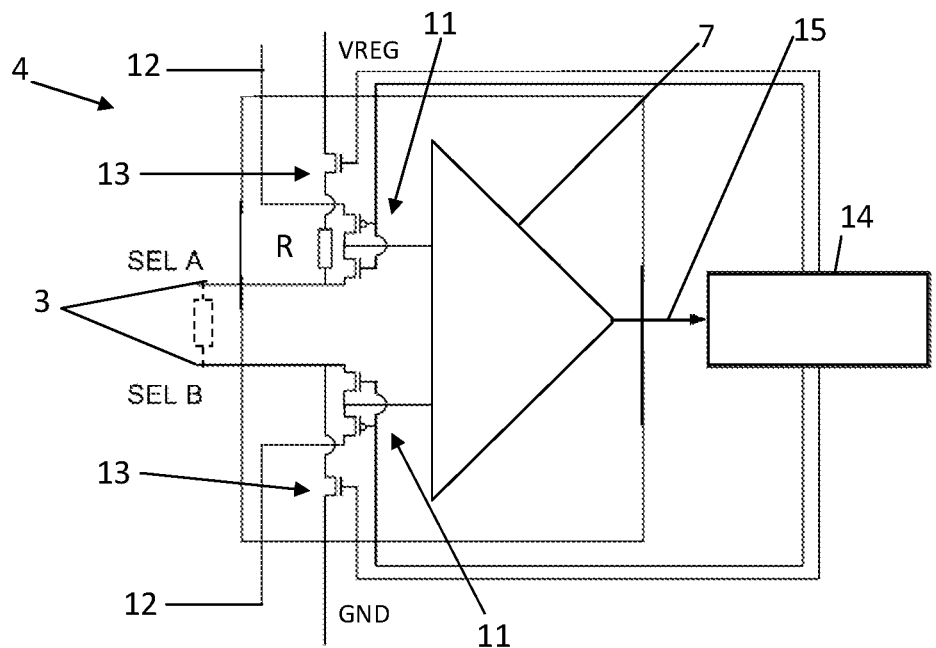
FIG. 4 shows a detecting circuit for a data bus node IC in accordance with embodiments of the present invention.

Referring to FIG. 4, an example of a detecting circuit 4 in accordance with embodiments of the present invention is shown.

The detecting circuit 4 may comprise switching means 13 for connecting and disconnecting the at least one static address selection terminal 3 via a resistive path to the regulated power supply voltage, e.g. over an internal resistor R, and for connecting and disconnecting the at least one static address selection terminal 3 to the ground voltage GND. Thus, the detecting circuit may generate a digital signal 15 representative of the externally connected resistance by applying the known electrical potential difference between the regulated power supply voltage and the ground voltage over a series connection of a known, e.g. a predetermined, reference resistor and the externally connected resistor. Thus, the voltage over the externally connected resistor can be measured to determine its resistance value. While it may be known in the art to use resistors to provide a voltage to an IC which encodes an address identifier, such passive addressing systems may depend on a stable external power supply. In embodiments of the present invention, an internal voltage regulator may be used to supply a local stable source to be used to determine an externally connected resistor's resistance. Thus, addressing failures due to fluctuations or deviations of the external power supply can be avoided. It is furthermore to be noted that an internal voltage regulator may also be advantageous for other components of the IC, e.g. where the IC comprises a sensitive sensor module.

Figure 5:
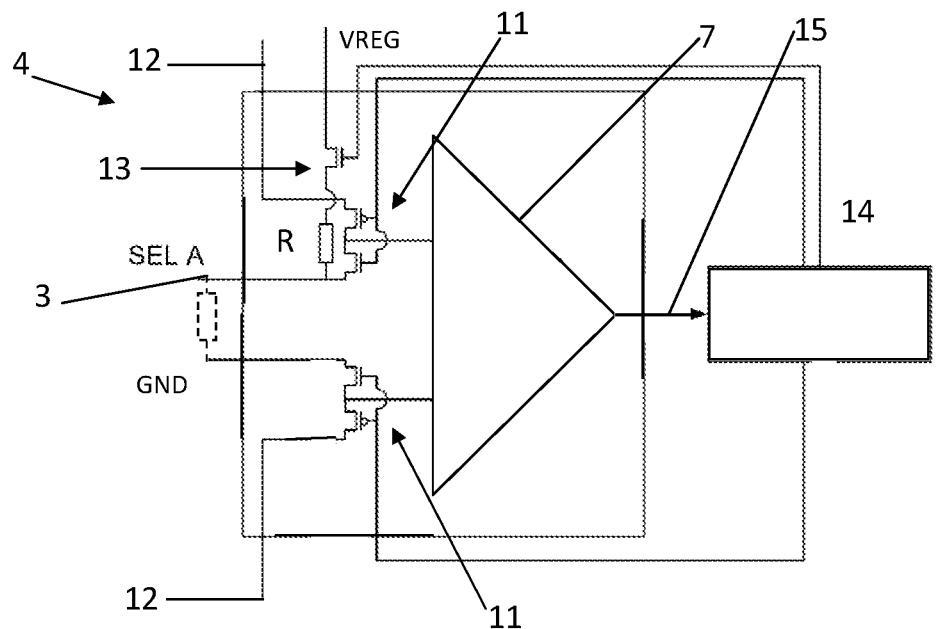
FIG. 5 shows another detecting circuit for a data bus node IC in accordance with embodiments of the present invention.

The detecting circuit 4 may comprise an analog-to-digital converter 7 (ADC) for supplying a digital value indicative for the electrical resistance between a pair SELA,SELB of static address selection terminals 3, e.g. over an electrically resistive path between two terminals SELA, SELB, as shown in FIG. 4. Alternatively, the analog-to-digital converter 7 may be adapted for supplying a digital value 15 indicative for the electrical resistance of a resistive element externally connected via the at least one static address selection terminal SELA to the ground voltage GND, as shown in FIG. 5.

Alternatively, the detecting circuit may comprise a time to digital conversion circuit for generating the signal indicative of the electrical property of the passive electronic component when connected to the at least one static address selection terminal.

Such time to digital conversion circuit may for example comprise a voltage controlled oscillator (VCO) configured for measuring the electrical resistance between a pair SELA, SELB of static address selection terminals, or for measuring the electrical resistance of a resistive element externally connected via the at least one static address selection terminal SELA to the ground voltage GND. Such voltage controlled oscillators, as known in the art, may provide an oscillating signal having a frequency that is indicative of the resistance being measured, e.g. a strong correlation may exist between the resistance connected to an input of the VCO and the frequency of an oscillating signal provided as an output of the VCO. It is known in the art that such voltage controlled oscillators may be used in a time to digital circuit arrangement as an alternative to analog-to-digital converters. Therefore, where in present description reference is made to an analog-to-digital converter in an embodiment of the present invention, other embodiments of the present invention may relate to an equivalent alternative that uses a time to digital circuit, e.g. comprising a voltage controlled oscillator, instead.

The detecting circuit 4 may also comprise a control unit 14, e.g. a microcontroller or finite state control circuit, for controlling the switching means 13 such as to connect the at least one static address selection terminal 3 to the regulated power supply voltage VREG, or to VREG and the ground supply voltage GND as shown in FIG. 4. This control unit 14 may also form part of the communication circuit 5, e.g. may be adapted for determining a node address identifier taking the detected state of the at least one static address selection terminal 3, e.g. in the form of said digital value 15, into account.

It is a particular advantage of embodiments of the present invention, for example embodiments which comprise a sensor module 8, that the ADC 7 may be connected to switching means 11 adapted for selectively routing either a signal from the at least one static address selection terminal 3 or from an analog signal chain 12, e.g. via a pair of internal connections to an analog signal chain, to the ADC 7. For example, the analog signal chain 12 may be connected to the sensor module 8, e.g. for conducting the at least one sensor measurement value in an analog form. Therefore, it is also an advantage of embodiments of the present invention that an efficient use of available external as well as internal connections of the integrated device, can be achieved, e.g. an address out of a large address space can be selected using only few pins, without requiring complex or expensive additional components. For example, in a prior art sensor IC having bus node capabilities, an analog-to-digital converter comprising a comparator 7 may typically already be present for reading out signals provided through an analog signal chain, e.g. for digitizing analog sensor readout signals, such that embodiments of the present invention may only imply a small additional cost, e.g. in terms of circuit real-estate, volume, power consumption and/or component cost. However, in other embodiments according to the present invention, the ADC 7 may be a dedicated ADC for addressing purposes, e.g. such as not to require additional switching means and/or a more complex signal routing layout and control flow.

A control unit 14 of the detecting circuit 4 may also be adapted for controlling the switching means 11 such as to determine the node address identifier in an address allocation mode, e.g. in a start-up or configuration phase during operation, and to process other analog values into digital form in a data acquisition mode, e.g. after the address was successfully determined.

Figure 11:
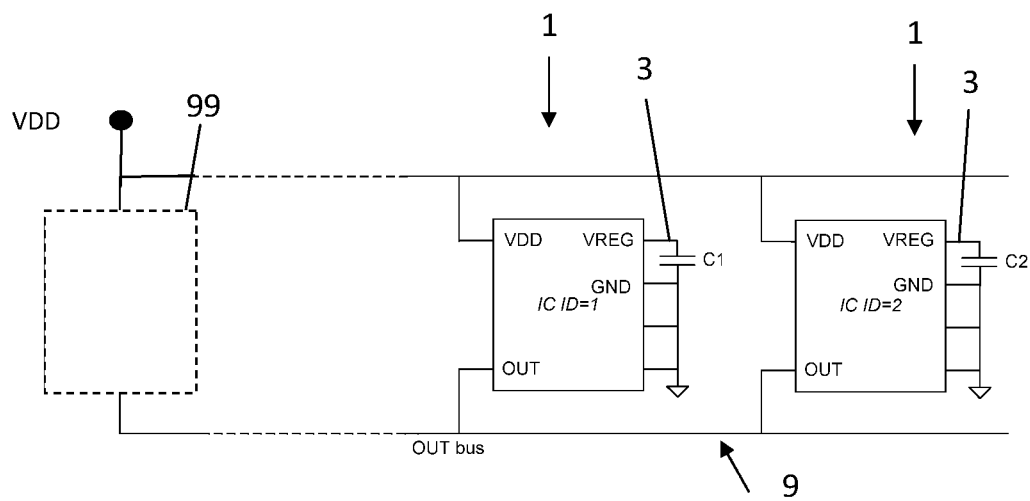
FIG. 11 shows a second exemplary network system according to embodiments of the present invention.

The detecting circuit 4 may be adapted for detecting the state of the at least one static address selection terminal 3 by generating a signal indicative of a characteristic time of an RC circuit comprising an internal resistor and an external capacitor C1,C2 when connected to the at least one static address selection terminal 3, e.g. as shown in FIG. 11.

The detecting circuit 4 may be adapted for detecting the state of the at least one static address selection terminal 3 by generating a signal indicative of a characteristic time of an RC circuit when connected to the at least one static address selection terminal 3. For example, the detecting circuit may be adapted for determining a time interval in which the voltage of the at least one address selection terminal rises from a first reference fraction, e.g. 0%, 10%, 25%, 33% or 50%, of the regulated power supply voltage to a second reference fraction, higher than the first fraction, e.g. 25%, 50%, 66%, 75%, 90%, 95% or 99% of the regulated power supply voltage. For example, the first reference fraction may correspond to a sufficient voltage to start operation of a timer circuit, while the second reference fraction may correspond to a sufficient voltage for triggering a switch for stopping this timer circuit.

The detecting circuit 4 may be adapted for detecting the state of the at least one static address selection terminal 3 by generating a signal indicative of a characteristic time of an RC circuit comprising an internal resistor and an external capacitor C1,C2 when connected to the at least one static address selection terminal 3, e.g. as shown in FIG. 11.

In embodiments of the present invention, the at least one static address selection terminal 3 may be the voltage supply terminal 2. Thus, it is an advantage of embodiments of the present invention that a single terminal of the IC pin-out can be used both as power supply and for address selection purposes.

Furthermore, the voltage regulator 10 for regulating the power supply voltage may advantageously use the energy storage and filtering capabilities provided by an RC circuit when connected to the static address selection terminal 3. Thus, the regulated voltage supply may for example provide a regulated voltage corresponding to a time-averaged DC component of the voltage supplied through a supply line, or a predetermined fraction of this time-averaged DC component. Thus, the detecting circuit 4 may be adapted for detecting the state of the at least one static address selection terminal 3 in relation to the regulated voltage supply, since both the regulated voltage and the address selection are determined by a capacitor connected to the IC 1 via the static address selection terminal 3.

For example, in the example shown in FIG. 6, a first IC (ID=1) connected to the data bus 9 may be connected via the static address selection terminal 3 to a first resistor R1 and a first capacitor C1, thus forming an RC circuit having characteristic time R1.C1. Likewise, a second IC (ID=2) connected to the data bus 9 may be connected via its static address selection terminal 3 to a second resistor R2 and a second capacitor C2, thus forming an RC circuit having characteristic time R2.C2. If R2.C2>R1.C1, the address assigned to the second circuit may be for example higher than the address assigned to the first circuit. For example, the first circuit may be assigned ID=1, while the second circuit is assigned ID=2.

Figure 10:
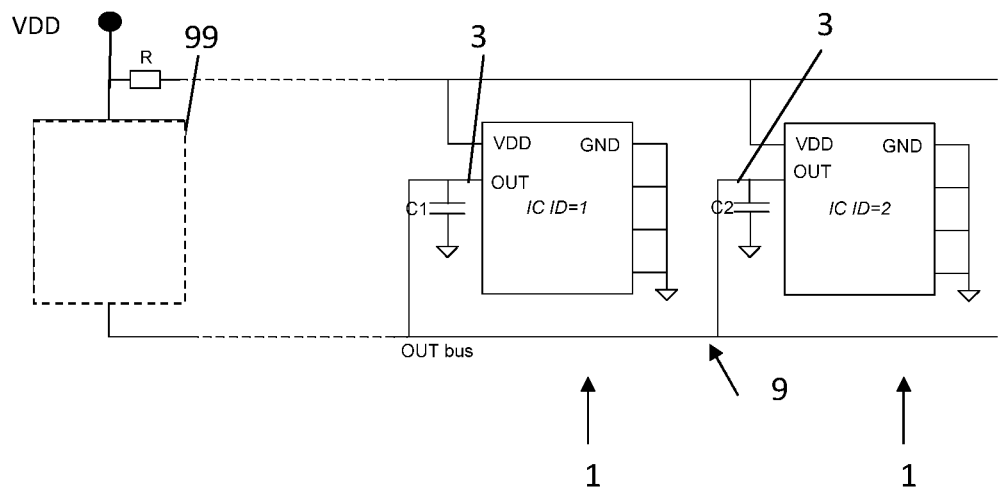
FIG. 10 shows a first exemplary network system according to embodiments of the present invention.

However, as shown in FIG. 10, a first IC (ID=1) may be connected to the data bus 9 and may be connected via the static address selection terminal 3 to a first capacitor C1. Furthermore, the IC comprises an internal resistor Ri which may connect the static address selection terminal 3, e.g. the OUT terminal in the example shown, to a supply voltage terminal VDD. The IC may also, for example, comprise switching means to only activate this connection of the static address selection terminal 3 to the supply voltage terminal, or alternatively an internal regulated supply or other suitable reference voltage, during an address determination mode of operation of the device, e.g. during an initial startup or an end-of-line programming of the device. Thus, an RC circuit having characteristic time Ri.C1 is formed. Likewise, a second IC (ID=2) connected to the data bus 9 may be connected via its static address selection terminal 3 to a second capacitor C2, thus forming an RC circuit having characteristic time Ri.C2, when the internal resistor Ri is connecting the static address selection terminal 3 to a reference voltage supply, e.g. to VDD. If Ri.C2>Ri.C1, the address assigned to the second circuit may be for example higher than the address assigned to the first circuit.

As shown in a further example illustrated by FIG. 11, the at least one static address selection terminal 3 may not necessarily be connected to the power supply terminal VDD and/or may not necessary be in direct contact with the controller 99.

Figure 7:
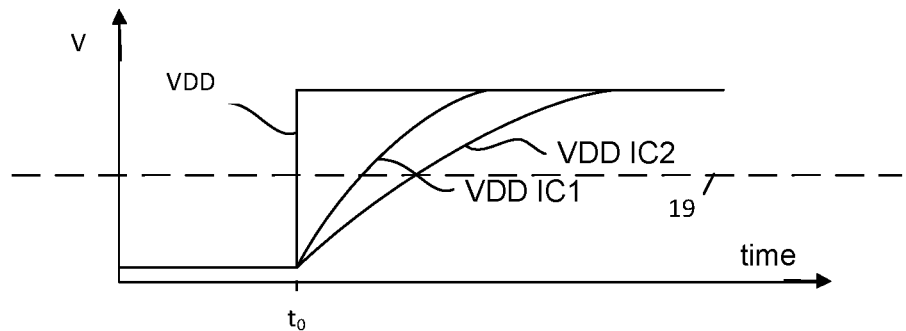
FIG. 7 shows a schematic time diagram relating to the data bus node ICs, illustrated in FIG. 6, according to embodiments of the present invention.

Referring to FIG. 7, at a particular instance in time $t_o$ an external power supply line may be switched on, causing the capacitors C1 and C2 to charge via the respective resistors R1 and R2. The detecting circuit 4 of each IC may be adapted for detecting the state of the at least one static address selection terminal 3 by generating a signal indicative of a characteristic time of the RC circuit when connected to the at least one static address selection terminal 3. For example, the detecting circuit may be adapted for generating a signal when the voltage of the at least one address selection terminal rises above a predetermined threshold voltage 19, e.g. a predetermined reference fraction of the regulated power supply voltage, e.g. higher than for example 25%, 50%, 66%, 75%, 90%, 95% or 99% of the regulated power supply voltage. This predetermined threshold voltage 19 may act as a communication threshold, e.g. when the signal is generated by the detecting circuit, the communication circuit 5 may transmit over the data bus. A central controller on the data bus may then respond by transmitting the address to be used by the IC, thereby incrementing an address counter for the following IC to request an address.

In a second aspect, the present invention also relates to a network system, e.g. a sensor network such as a vehicle sensor network, comprising a plurality of data bus node integrated circuits according to embodiments of the first and/or fourth aspect of the present invention, for example as shown in FIG. 2, FIG. 3, FIG. 6, FIG. 10 and FIG. 11. This network system further comprises a data bus 9 for relaying data from and/or to the plurality of data bus node integrated circuits 1. This data bus 9 may be for example a CAN, LIN or SENT data bus. Such network system may comprise other components as known in the art, e.g. may comprise a controller 91 connected to said data bus 9, as shown in FIG. 10 and FIG. 11.

The network system may furthermore comprise a plurality of passive electronic components, each passive electronic component being connected to a static address selection terminal of a corresponding data bus node integrated circuit of the plurality of data bus node integrated circuits. Each passive electronic component may furthermore be a component separate from each of the data bus node integrated circuits, e.g. a passive electronic component that is not integrated in any of the data bus node integrated circuits. For example, each of the data bus node integrated circuits may be identical, e.g. identically manufactured, yet uniquely configured by the connection to a passive electronic component having different electrical characteristics, e.g. a different resistance, capacitance or impedance.

In a third aspect, the present invention may also relate to a method for statically addressing a plurality of data bus node integrated circuits on a data bus. The method comprises connecting a plurality of data bus node integrated circuits to a data bus. The method may also comprise connecting the plurality of data bus node integrated circuits to a power supply voltage and to a ground voltage. Each data bus node integrated circuit comprises at least one static address selection terminal. The method may also comprise regulating the power supply voltage in each data bus node at a predetermined regulated power supply voltage level.

The method further comprises electrically connecting the at least one static address selection terminals of the data bus node integrated circuits to corresponding passive electronic components such as to provide a unique state or unique combination of states on the at least one static address selection terminal of each data bus node integrated circuit. The method also comprises detecting the state of the at least one static address selection terminal in each data bus node integrated circuit by determining an electrical property of the passive electronic component connected thereto. The method also comprises determining a node address identifier in each data bus node integrated circuit taking the detected state of the at least one static address selection terminal into account.

This method also comprises receiving and/or transmitting data over the data bus in accordance with a first communication protocol using the node address identifier determined in each data bus node integrated circuit for identification of the data bus node integrated circuit, and configuring a further node address identifier for each data bus node integrated circuit taking data received by the data bus node integrated circuit using the first communication protocol into account. The method further comprises receiving and/or transmitting data over the data bus in accordance with a second communication protocol using this further node address identifier for identification of each data bus node integrated circuit.

The step of detecting the state of the at least one static address selection terminal may comprise, in each data bus node integrated circuit, switching a switching means, e.g. a switch, e.g. an integrated electronic switch such as a transistor switch. This switching means is integrated in the data bus node integrated circuit. The switching means may be switched such as to route a signal from the at least one static address selection terminal to an analog-to-digital converter or, alternatively, to a time to digital conversion circuit. The analog-to-digital converter or time to digital conversion circuit may also be integrated in the data bus node integrated circuit. Furthermore, the step of detecting the state of the at least one static address selection terminal may comprise generating a signal indicative of the electrical property of the passive electronic component using the analog-to-digital converter or time to digital conversion circuit, e.g. after having switched the switching means to route the signal from the at least one static address selection terminal to the analog-to-digital converter or time to digital conversion circuit. The step of detecting the state of the at least one static address selection terminal may further comprise switching the switching means such as to route a signal from an analog signal chain to the analog-to-digital converter or the digital conversion circuit, e.g. after the signal indicative of the electrical property of the passive electronic component has been generated using the analog-to-digital converter.

Figure 8:
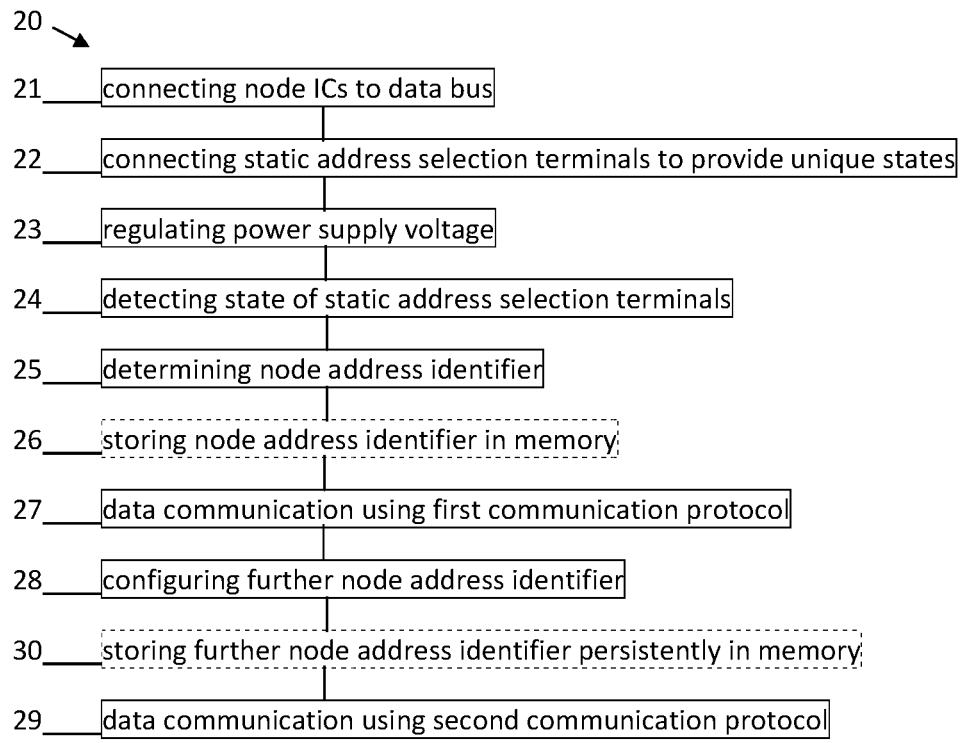
FIG. 8 shows an exemplary method according to embodiments of the present invention.

Referring to FIG. 8, an exemplary method 20 according to embodiments of the present invention is shown. This method 20 for statically addressing a plurality of data bus node integrated circuits 1 on a data bus 9 comprises connecting 21 a plurality of data bus node integrated circuits 1 to a data bus 9. For example a plurality of data bus node ICs 1 according to the first aspect of the present invention may be connected to a data bus 9, such as a LIN, SENT data bus. Each data bus node integrated circuit 1 comprises at least one static address selection terminal 3, e.g. as explained hereinabove in relation to the first aspect of the present invention. Each data bus node integrated circuit 1 may also be adapted for transmitting and/or receiving data over the data bus 9 in accordance with a LIN or SENT communication protocol. This step of connecting 21 may also comprise connecting the plurality of ICs 1 to a supply voltage VDD and a ground voltage GND.

The method further comprises electrically connecting 22 the at least one static address selection terminals 3 of the data bus node integrated circuits 1 to corresponding passive electronic components such as to provide a unique state or a unique combination of states on the at least one static address selection terminal of each data bus node integrated circuit, e.g. unique in the sense that no two ICs 1 on the same data bus 9 have the same state configuration of the at least one static address selection terminal 3 as determined by properties of corresponding passive electronic components connected thereto.

For example, the method may comprise connecting to the at least one address selection terminal of each data bus node integrated circuit a resistor having a distinctive electrical resistance with respect to the resistors connected the other data bus node integrated circuits. In a method according to embodiments of the present invention, the resistor may be connected by one end to the at least one static address selection terminal 3 and by the other end to the ground voltage. In a method according to other embodiments of the present invention, the resistor may be connected by each end to a corresponding static address selection terminal of the IC.

The method may comprise connecting to the at least one static address selection terminal of each data bus node integrated circuit a resistor-capacitor circuit, e.g. forming an electrical path from the address selection terminal over the resistor to a supply voltage line while the address selection terminal is capacitively coupled to the ground via the capacitor. In such a method according to embodiments of the present invention, the at least one static address selection terminal may comprise the voltage supply terminal, e.g. the method may comprise connecting a resistor-capacitor circuit to the voltage supply terminal, acting as static address selection terminal.

The method 20 may further comprise regulating 23 the power supply voltage in each data bus node at a predetermined regulated power supply voltage level. This regulating 23 of the power supply voltage may comprise taking advantage of energy storage and filtering capabilities of the resistor-capacitor circuit connected to the static address selection terminal, e.g. connected to the supply voltage terminal acting as static address selection terminal. Thus in embodiments where the passive electronic components are resistor-capacitor circuits, these RC circuits may advantageously offer both a means for robust address selection as well as a means for voltage supply stabilization. Furthermore, in embodiments where the passive electronic components are resistors, the voltage regulation may advantageously offer a robust reference for determining the resistance, thus avoiding address assignment errors due to power fluctuations. While regulating the power supply voltage offers the advantage of robust operation of the IC device, and particularly may enable robust address assignment, regardless of the passive electronic components used to encode the selected addresses, the RC circuit embodiments and resistor embodiments described hereinabove each offer synergistic advantages.

The method 20 also comprises detecting 24 the state of the at least one static address selection terminal 3 in each data bus node integrated circuit 9 by determining an electrical property of the passive electronic component connected thereto. For example, this detecting 24 may comprise an automatic determining by the IC 1 of an electrical resistance of the passive electronic component connected thereto, e.g. of a resistor connected thereto.

For example, detecting 24 may comprise applying the regulated power supply voltage via a serial chain to ground, in which this serial chain comprises: an internal reference resistor in the IC and the resistor externally connected to the IC via the at least one static address selection terminal 3. Detecting 24 may furthermore comprise generating a signal indicative of the electrical resistance of the resistor externally connected to the at least one static address selection terminal.

The detecting 24 may comprise an automatic determining by the IC 1 of a characteristic time of the passive electronic component connected thereto, e.g. of a resistor-capacitor circuit connected thereto. Note that determining the characteristic time of an RC circuit is a time-integration process, such that transient fluctuations of the voltage charging the capacitor may be averaged out.

For example, detecting 24 may comprise determining a time interval in which the voltage of the at least one address selection terminal rises from a first reference fraction of the regulated power supply voltage level to a second reference fraction of the of the regulated power supply voltage level, e.g. the time the rise from substantially zero to, for example, 90% of the level at which the power supply voltage is regulated in the IC. Detecting 24 may thus comprise generating a signal indicative of a characteristic time of the RC circuit, in which this signal is for example generated when the voltage of the at least one address selection terminal rises above a predetermined threshold voltage.

The method further comprises determining 25 a node address identifier in each data bus node integrated circuit taking the detected state of the at least one static address selection terminal for the corresponding integrated circuit 1 into account. The method 20 may also comprise storing 26 the node address identifier for each data bus node integrated circuit in a storage memory of the corresponding data bus node integrated circuit. For example, the node address identifier may be stored in a non-volatile memory, such that the static address determination method may only be performed once, e.g. upon installation of the ICs on the data bus, such as in a calibration phase of a system assembly process.

Furthermore, the method may relate to an end of line calibration using a deterministic communication protocol different from the communication protocol for normal operation, as described in detail hereinabove. For example, the deterministic communication protocol may refer to a proprietary protocol for end-of-line calibration of the integrated circuit. Thus, a UUID node address identifier during start-up or calibration, e.g. a hardware-based UUID in accordance with embodiments of the present invention, may differ from a UUID programmed during start-up or calibration, e.g. received from a controller, e.g. an end-of-line calibration controller for configuring the system in which the integrated circuit is installed.

For example, a customer may assemble a system, e.g. an automotive sensor network, for example a system comprising integrated circuits according to an embodiment of the present invention. This customer may perform an end-of-line calibration flow, for example using a proprietary protocol of IC vendor. In this calibration, a method according to embodiments may be used for deterministically determining the installation location in the system for each IC. The end-of-line flow then may determine a UUID for each IC, taking the installation location into account. This UUID may for example be stored in a memory element of each IC. This UUID and the deterministic hardware ID are not necessarily identical, although specific embodiments of the present invention may use such identity relation for simplicity. The system may then use, during normal operation, e.g. after end-of-line calibration, the UUID for communication over a data bus, e.g. for LIN or SENT communication.

Thus, a method according to embodiments of the present invention comprises receiving and/or transmitting data 27 over the data bus in accordance with a first communication protocol, e.g. a protocol specifically for use in end-of-line calibration, using the node address identifier determined in each data bus node integrated circuit for identification of that data bus node integrated circuit. The method further comprises configuring 28 a further node address identifier for each data bus node integrated circuit, in which this configuration takes data received by that data bus node integrated circuit using the first communication protocol into account. For example, each data bus node may communicate with a master device for assigning the further node address identifier. The method may also comprise storing 30 the further node address identifier in memory, e.g. persistently storing the further node address identifier in memory. The method further comprises receiving and/or transmitting data 29 over the data bus in accordance with a second communication protocol, e.g. a LIN, SENT or other communication protocol for use after calibration and configuration, e.g. after end-of-line calibration, using the further node address identifier for identification of each data bus node integrated circuit.

In a fourth aspect, the present invention relates to a data bus node integrated circuit comprising at least one static address selection terminal, a detecting circuit, e.g. a detection circuit, for detecting a state of the at least one static address selection terminal, and a communication circuit for receiving and/or transmitting data over a data bus. The communication circuit is also adapted for, e.g. configured and/or programmed for, determining a node address identifier taking the detected state of the at least one static address selection terminal into account. The detecting circuit is furthermore adapted for detecting the state of the at least one static address selection terminal by determining an electrical property of a passive electronic component when connected to the at least one static address selection terminal. The detecting circuit is furthermore adapted for, e.g. configured and/or programmed for, generating a signal indicative of an electrical resistance of a resistor when said resistor is connected to said at least one static address selection terminal.

Essential and/or optional features and characteristics of a data bus node integrated circuit in accordance with embodiments of this fourth aspect of the present invention will be clear from the description provided hereinabove in relation to the first aspect of the present invention. However, in accordance with embodiments of the fourth aspect of the present invention, the communication circuit is not necessarily adapted for receiving and/or transmitting data over the data bus in accordance with a second communication protocol using a further node address identifier for identification of the data bus node integrated circuit. The detecting circuit, in accordance with embodiments of the fourth aspect of the present invention, does however comprise an analog-to-digital converter or a time to digital conversion circuit for generating a signal indicative of the electrical property of the passive electronic component when connected to the at least one static address selection terminal, and switching means adapted for selectively routing either a signal from the at least one static address selection terminal or from an analog signal chain to the analog-to-digital converter or time to digital conversion circuit. A data bus node integrated circuit according to embodiments of the fourth aspect of the present invention, may furthermore comprise a power supply terminal for receiving a power supply voltage and a voltage regulator for regulating the power supply voltage at a predetermined regulated power supply voltage level. The detecting circuit may furthermore be adapted for, e.g. configured and/or programmed for, applying the regulated power supply voltage to a serial chain to ground. The serial chain, e.g. an electrical series chain, may comprise a reference resistor and said resistor when connected to the at least one static address selection terminal.

In a data bus node integrated circuit according to embodiments of the fourth aspect of the present invention, the detecting circuit may comprise switching means for controllably connecting and disconnecting the at least one static address selection terminal via the reference resistor to the regulated power supply voltage.

In a data bus node integrated circuit according to embodiments of the fourth aspect of the present invention, the detecting circuit may be adapted for generating a signal indicative of the electrical resistance of said resistor when said resistor connects the at least one static address selection terminal to the ground voltage.

In a data bus node integrated circuit according to embodiments of the fourth aspect of the present invention, the at least one static address selection terminal may comprise a pair of static address selection terminals, and the detecting circuit may be adapted for generating a signal indicative of the electrical resistance of said resistor when said resistor electrically connects the pair of static address selection terminals.

A data bus node integrated circuit according to embodiments of the present invention may furthermore comprise a sensor module for providing at least one sensor measurement value to the communication circuit, e.g. via said analog signal chain. The communication circuit may furthermore be adapted for transmitting the at least one sensor measurement value via the data bus.

The invention claimed is:

1. A data bus node integrated circuit comprising:
  at least one static address selection terminal,
  a detecting circuit for detecting a state of the at least one static address selection terminal, and
  a communication circuit for receiving and/or transmitting data over a data bus and adapted for determining a node address identifier taking the detected state of the at least one static address selection terminal into account,
  wherein the detecting circuit is adapted for detecting the state of the at least one static address selection terminal by determining an electrical property of a passive electronic component when connected to said at least one static address selection terminal,
  said communication circuit furthermore being adapted for receiving and/or transmitting data over said data bus in accordance with a first communication protocol using said node address identifier for identification of the data bus node integrated circuit,
  said communication circuit furthermore being adapted for receiving and/or transmitting data over said data bus in accordance with a second communication protocol using a further node address identifier for identification of the data bus node integrated circuit,
  the first communication protocol being a deterministic protocol for calibration, the first communication protocol being different from the second communication protocol used in transmission of data over the communication circuit, wherein said communication circuit is adapted for configuring the further node address identifier by using data received using said first communication protocol such that the further node address identifier is assigned using the first communication protocol and said node address identifier.

2. The data bus node integrated circuit according to claim 1, wherein the detecting circuit is adapted for generating a signal indicative of an electrical resistance of a resistor when said resistor is connected to said at least one static address selection terminal.

3. The data bus node integrated circuit according to claim 2, furthermore comprising a power supply terminal for receiving a power supply voltage and a voltage regulator for regulating the power supply voltage at a predetermined regulated power supply voltage level, and wherein said detecting circuit is adapted for applying said regulated power supply voltage to a serial chain to ground, said serial chain comprising a reference resistor and said resistor when connected to said at least one static address selection terminal.

4. The data bus node integrated circuit according claim 3, wherein said detecting circuit furthermore comprises a switch configured to controllably connect and disconnect the at least one static address selection terminal via said reference resistor to the regulated power supply voltage.

5. The data bus node integrated circuit according to claim 2, wherein said detecting circuit is adapted for generating a signal indicative of the electrical resistance of said resistor when said resistor connects the at least one static address selection terminal to the ground voltage.

6. The data bus node integrated circuit according to claim 2, wherein said at least one static address selection terminal comprises a pair of static address selection terminals and wherein said detecting circuit is adapted for generating a signal indicative of the electrical resistance of said resistor when said resistor electrically connects said pair of static address selection terminals.

7. The data bus node integrated circuit according to claim 2, wherein said detecting circuit comprises an analog-to-digital converter or a time to digital conversion circuit for generating a signal indicative of said electrical property of said passive electronic component when connected to said at least one static address selection terminal, and a switch adapted to selectively route either a signal from the at least one static address selection terminal or from an analog signal chain to said analog-to-digital converter or said time to digital conversion circuit.

8. The data bus node integrated circuit according to claim 1, wherein the detecting circuit is adapted for generating a signal indicative of the characteristic time of a resistor-capacitor circuit when said resistor-capacitor circuit is connected to the at least one static address selection terminal.

9. The data bus node integrated circuit according to claim 1, wherein the detecting circuit is adapted for generating a signal indicative of the characteristic time of a resistor-capacitor circuit comprising an internal resistor and a capacitor when said capacitor is connected to the at least one static address selection terminal.

10. The data bus node integrated circuit according to claim 8, furthermore comprising a power supply terminal for receiving a power supply voltage and a voltage regulator for regulating the power supply voltage at a predetermined regulated power supply voltage level, and wherein the detecting circuit is adapted for determining a time interval in which the voltage of the at least one address selection terminal rises from a first reference fraction of the regulated power supply voltage level to a second reference fraction of the regulated power supply voltage level.

11. The data bus node integrated circuit according to claim 10, wherein the at least one static address selection terminal comprises said power supply terminal, and wherein said voltage regulator is adapted for regulating the power supply voltage by taking advantage of energy storage and filtering capabilities of said resistor-capacitor circuit.

12. The data bus node integrated circuit according to claim 8, wherein said detecting circuit is adapted for generating said signal indicative of said characteristic time when the voltage of the at least one address selection terminal rises above a predetermined threshold voltage.

13. A network system comprising a plurality of data bus node integrated circuits according to claim 1 and a data bus for relaying data from and/or to said plurality of data bus node integrated circuits, said network system furthermore comprising a plurality of passive electronic components, each passive electronic component being connected to a static address selection terminal of a corresponding data bus node integrated circuit of said plurality of data bus node integrated circuits, each passive electronic component being a component separate from each of the data bus node integrated circuits.

14. The data bus node integrated circuit according to claim 1, wherein the first communication protocol is a proprietary deterministic protocol for end-of-line calibration of the integrated circuit.

15. The data bus node integrated circuit according to claim 1, wherein the first communication protocol, as the deterministic protocol, is based on a protocol provided by a manufacturer of the integrated circuit for calibration and initialization of the integrated circuit without conforming, at least in part, with an industry-wide communication standard.

16. A method for statically addressing a plurality of data bus node integrated circuits on a data bus, the method comprising:
   connecting a plurality of data bus node integrated circuits to a data bus, each data bus node integrated circuit comprising at least one static address selection terminal,
   electrically connecting the at least one static address selection terminals of the data bus node integrated circuits to corresponding passive electronic components such as to provide a unique state or unique combination of states on the at least one static address selection terminal of each data bus node integrated circuit,
   detecting said state of the at least one static address selection terminal in each data bus node integrated circuit by determining an electrical property of said passive electronic component connected thereto,
   determining a node address identifier in each data bus node integrated circuit taking said detected state of the at least one static address selection terminal into account,
   receiving and/or transmitting data over said data bus in accordance with a first communication protocol using said node address identifier determined in each data bus node integrated circuit for identification of said data bus node integrated circuit,
   configuring a further node address identifier for each data bus node integrated circuit taking data received by said data bus node integrated circuit using said first communication protocol into account such that the further node address identifier is assigned using the first communication protocol and said node address identifier through communication with the data bus node integrated circuit, and receiving and/or transmitting data over said data bus in accordance with a second communication protocol using said further node address identifier for identification of each data bus node integrated circuit, the first communication protocol being a deterministic communication protocol for calibration, and being different from the second communication protocol used in transmission of data over the communication circuit.

17. The data bus node integrated circuit according to claim 9, furthermore comprising a power supply terminal for receiving a power supply voltage and a voltage regulator for regulating the power supply voltage at a predetermined regulated power supply voltage level, and wherein the detecting circuit is adapted for determining a time interval in which the voltage of the at least one address selection terminal rises from a first reference fraction of the regulated power supply voltage level to a second reference fraction of the regulated power supply voltage level.

18. The data bus node integrated circuit according to claim 17, wherein the at least one static address selection terminal comprises said power supply terminal, and wherein said voltage regulator is adapted for regulating the power supply voltage by taking advantage of energy storage and filtering capabilities of said resistor-capacitor circuit.

* * * * *